G. L. BALLARD.
DOGS FOR KNITTING MACHINES.
APPLICATION FILED JUNE 28, 1912.
1,101,388.
Patented June 23, 1914.
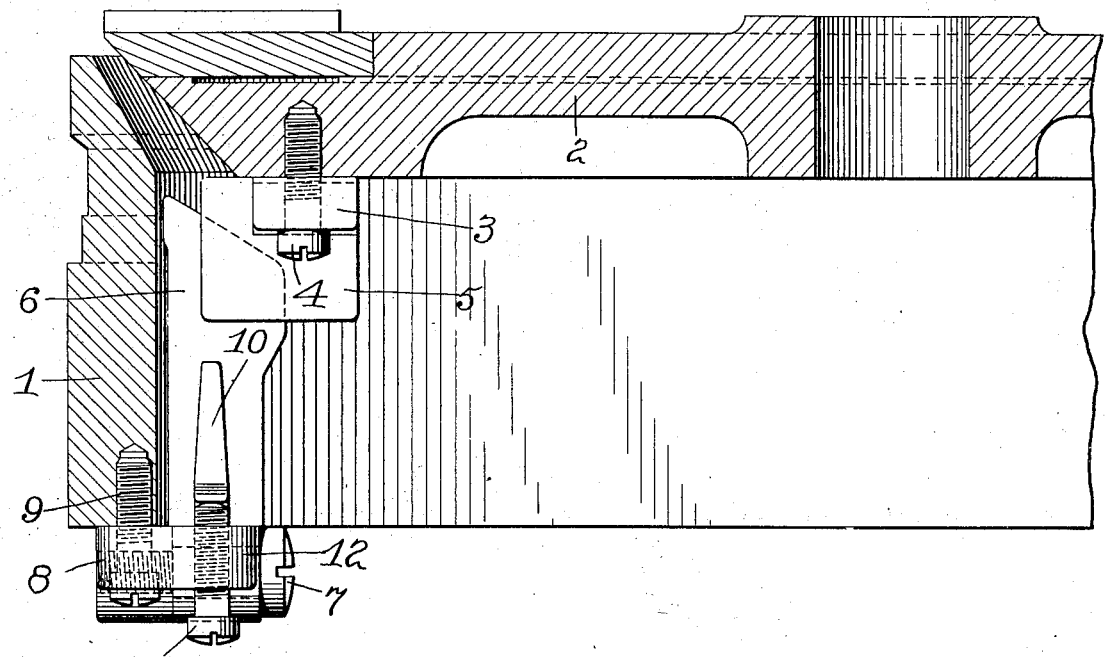
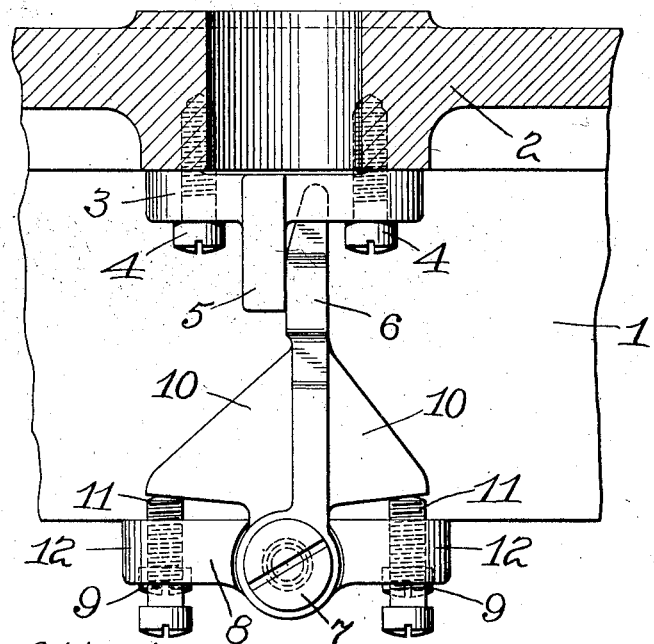
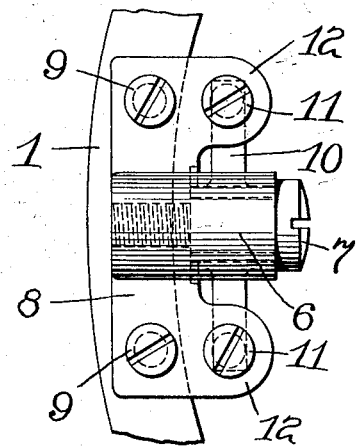
Attest:
Ewd L. Tolson.
Chas. F. Calhoun.
Inventor:
George L. Ballard,
by Spear, Middleton, Donaldson & Spear
Atty's

UNITED STATES PATENT OFFICE.

GEORGE LAWSON BALLARD, OF NORRISTOWN, PENNSYLVANIA, ASSIGNOR TO WILDMAN MFG. CO., OF NORRISTOWN, PENNSYLVANIA.

DOGS FOR KNITTING-MACHINES.

1,101,388.   Specification of Letters Patent.   Patented June 23, 1914.

Application filed June 28, 1912. Serial No. 706,476.

*To all whom it may concern:*

Be it known that I, GEORGE LAWSON BALLARD, a subject of the King of Great Britain, and resident of Norristown, Pennsylvania, have invented certain new and useful Improvements in Dogs for Knitting-Machines, of which the following is a specification.

My invention relates to circular rib knitting machines of the type in which the needle dial is held in proper relation to the needle cylinder by interlocking dogs.

It is the object of my invention to provide a construction in which the dogs will be readily accessible for adjustment and in which the adjustment may be easily effected.

The invention consists in the features and combination and arrangement of parts hereinafter described and particularly pointed out in the claim.

In the accompanying drawings Figure 1 is a vertical sectional view of a portion of a dial and cylinder of a rib knitting machine, with the dogs in place; Fig. 2 is a sectional view of the dial with a part of the cylinder in elevation, and with the dogs in place; and Fig. 3 is a bottom plan view of the dog bracket.

In these drawings, 1 indicates the cylinder, 2 the dial, 3 a dog attached to the underside of the dial by screws 4. This dog has a depending portion 5 against which bears the upwardly extending end 6 of the cylinder dog, which is pivoted at 7 to a bracket 8 secured by screws 9 to the lower face of the cylinder. The cylinder dog has laterally extending portions 10 which overlie adjusting screws 11 mounted in ears 12 of the bracket 8, so that by adjusting these screws the upwardly extending cylinder dog can be tipped in one direction or the other or set exactly vertical, as the adjustment of the cylinder and dial in respect to each other may require. The dog 6 bears with its side face against the dial dog 5, and it will thus be seen that the dial may be accurately adjusted in relation to the cylinder by adjusting the cylinder dog 6, as may be required, by means of the screws 9. It will be observed that as the adjustment takes place at the cylinder dog and as this is secured to the extreme lower edge or face of the cylinder, and as the adjusting screws depend below this face and extend vertically, adjustment may be readily effected because of the easy access to the adjusting screws, the slotted heads of which face downwardly.

I claim as my invention:

In combination with a cylinder and dial of a rib knitting machine, a dial dog fixed to the bottom of the dial and a cylinder dog, said cylinder dog being mounted on a pivot, the axis of which is disposed radially in relation to the cylinder, said cylinder dog extending upwardly from its pivot and bearing on the side of the dial dog, said cylinder dog having projections extending laterally therefrom on each side of its pivot, adjusting screws vertically disposed and bearing on said projections, and a bracket carrying the said screws and the pivot of the cylinder dog, substantially as described.

In testimony whereof, I affix my signature in presence of two witnesses.

GEORGE LAWSON BALLARD.

Witnesses:
E. R. ROBERTS,
OWEN BALLARD.